United States Patent [19]
Stewart

[11] Patent Number: 5,706,991
[45] Date of Patent: Jan. 13, 1998

[54] PORTABLE TOOL HOLDER WITH STABILIZING BASE

[75] Inventor: Robert A. Stewart, Naples, Me.

[73] Assignee: Jay Nagengast, Raymond, Me.; a part interest

[21] Appl. No.: 607,695

[22] Filed: Feb. 27, 1996

[51] Int. Cl.$^6$ .................................................. B60R 11/06
[52] U.S. Cl. ........................... 224/539; 224/540; 108/44; 206/349
[58] Field of Search ....................... 224/275, 539, 224/542, 540, 42.11, 42.12, 42.13; 296/37.1; 211/20, 23, 24; 206/372, 373, 561, 304, 304.2, 349; 248/346.01, 214; 220/608; 108/44; D12/415, 416, 421, 423, 424, 425, 426

[56] References Cited

U.S. PATENT DOCUMENTS

| | | | |
|---|---|---|---|
| 369,494 | 9/1887 | Bailey | 211/24 |
| 3,372,812 | 3/1968 | Parcels | 206/561 |
| 4,300,709 | 11/1981 | Page, Jr. | 224/540 |
| 4,341,304 | 7/1982 | Diller | 224/540 |
| 4,714,158 | 12/1987 | Oltman et al. | 206/373 |
| 5,107,949 | 4/1992 | Gotoh et al. | 224/413 |
| 5,203,479 | 4/1993 | Lucas | 296/37.1 |
| 5,339,955 | 8/1994 | Horan et al. | 206/561 |

FOREIGN PATENT DOCUMENTS

| | | | |
|---|---|---|---|
| 322039 | 6/1989 | European Pat. Off. | 248/346.01 |
| 1537233 | 12/1978 | United Kingdom | 296/37.1 |
| 2067521 | 7/1981 | United Kingdom | 224/543 |

Primary Examiner—Henry J. Recla
Assistant Examiner—Gregory M. Vidovich
Attorney, Agent, or Firm—Chris A. Caseiro; Thomas L. Bohan

[57] ABSTRACT

A holder for tool transport and method for transporting tools is provided. The holder includes a compartmentalized top section with an optional handle. A securable cover may be included to protect tool during transport. The base of the holder includes both a contiguous edge that provides suitable support during placement on a flat surface and a curved cavity that provides suitable support during placement on a component of mobile machinery to be serviced. The component can be a wheel and the cavity can be configured to allow for placement on substantially all wheel types and size.

4 Claims, 1 Drawing Sheet

PORTABLE TOOL HOLDER WITH STABILIZING BASE

BACKGROUND OF THE INVENTION

1. Field of the Invention

The present invention relates to storage devices. More specifically, this invention relates to storage devices for storing and carrying tools used in the servicing of machinery having wheels.

2. Background of the Invention

The servicing of mobile machinery is a situation well known in today's automotive-dependent society. Cars will, and often do, exhibit mechanical difficulties in nearly every imaginable place and time. Further, this problem is not limited to passenger automobiles. Trucks, buses, trailers, and farm equipment all commonly suffer from mechanical failures at various times and locations. This problem is inherent to all mobile machinery. However, the vast majority of mechanical difficulties do not require immediate attention. At those times, the machinery may be located in a convenient location, such as a garage, that is conducive to servicing. Common to either situation is a further problem addressed by the instant invention.

In servicing both on-site and in garages, the problem arises of having limited or inconvenient places to put one's tools. Most of the time, tools are kept together in heavy toolboxes and a tool user will only select a few tools to work with near the machinery. Alternatively, small portable toolboxes, commonly with flat bottoms, are used near the machinery. Then, the user normally has two choices in the placement of the tools or flat bottomed toolbox being used. The tools are placed either somewhere on the ground near the machinery or placed somewhere on the machinery itself. Tool placement on the ground poses a safety hazard due to the increased likelihood that the user, or another person, will trip on the tools. Damage to tools may also occur. Further, the possibility of losing tools is increased, either because they fall out of position or they are simply left in machinery, such as a truck, that eventually leaves the garage. Situations where the user places the tools somewhere on a moving part of the machinery are even more problematic in that damage may occur to the tool and/or the moving part of the machinery.

Commonly, machinery being serviced will have its cover or hood open. At that point, very little flat area is available on the machinery upon which the user may place the tools or flat-bottomed toolbox within easy reach. Users have been known to place tools within engine compartments. Such placement invites disaster for the reasons noted. Further, balancing tools or flat-bottomed toolboxes on bumpers, fenders, tires, or other such rounded parts of the machinery is unmanageable in most instances. Several prior-art attempts to alleviate related problems exist. Each provides a form of carrier coupled to tire covers or fenders.

The device of Brown et al. (U.S. Pat. No. 1,186,073) shows a combined tire trunk and tool box. Although this design provides tool access, it lacks portability. Such an integrated design is heavy and limited in placement to an area on a running board. It is intimately joined to the vehicle and is likely relatively expensive. The devices of Coombes (U.S. Pat. No. 1,938,739), Lauderdale (U.S. Pat. No. 4,136,904), and Smith-Williams (U.S. Pat. No. 4,384,663) all show variations of a toolbox in combination with a fender. The devices of Coombes and Smith-Williams are externally supported separately from each respective tire and fail to exhibit portability. The device of Lauderdale is a permanently-mounted tool box internally supported within an engine compartment. Such an internal design is unlikely in modern engine compartments that are usually crowded. The internal placement also encourages the dangerous habit of leaving loose tools on machine parts within the engine compartment. The devices of Lucas (U.S. Pat. No. 5,203,479) and Stout (U.S. Pat. No. 5,228,608) show similar removable storage carriers. Both of these designs involve an integrated tire cover and side mounted storage box that is mounted on a spare tire. Neither Lucas nor Stout enable a user to manageably carry their respective storage boxes.

None of the prior-art devices mentioned above provide a portable, lightweight, tool holder of the design disclosed herein which would enable a user to securely place tools on any wheel, or protrusion, conveniently close yet out of any hazardous or precarious position. Therefore, what is needed is a tool-holding device which is portable and that can be easily stabilized on the tire or wheel of equipment to be repaired or maintained. What is also needed is a portable tool holder that provides safe, quick, and convenient access to tools by a tool user. Such a device must be handleable by a single person and must be sufficiently tough to withstand the effect of daily use in a repair shop environment.

SUMMARY OF THE INVENTION

Accordingly, it is an objective of the present invention to provide a tool-holding device which is portable and that can be easily stabilized on the tire or wheel of equipment to be repaired or maintained. It is a further object of the present invention to provide a portable tool holder that gives safe, quick, and convenient access to tools by a tool user. Yet further, it is an object of the present invention to provide such a device that is handleable by a single person and that is sufficiently tough to withstand the effect of daily use in a repair shop environment.

These objectives are accomplished by a tool-holding apparatus and a method of using the apparatus, in accordance with preferred embodiments of the present invention. The apparatus includes a top section and a bottom section. Partition members and a handle are formed within the top section. Sidewalls surround the top section. A cavity portion is located within the bottom section of the device. A curved area exists within the cavity portion and is designed to conform generally to a shape of a tire, or other aspect of the machinery to be worked on. The top section of the device is suitable for storage of tools such as screwdrivers, wrenches, and similar items common to servicing of mobile machinery. The top and bottom sections may be made in parts or as a unitary piece fabricated of metal such as aluminum or steel, or of non-metallic materials, such as plastic or rubber.

The preferred method of the present invention involves providing a tool holder of the type according to the present invention for use upon a wheel of a mobile machine. The tool holder is loaded with tools and brought to a wheel of the mobile machine nearest the portion of the mobile machine to be serviced. The tool holder is then aligned with the cylindrical portion of the wheel generally described as the track or tread of the wheel, and is placed upon a portion of the wheel's tread. The tool holder is preferably fitted securely upon the wheel. At this point the tools loaded within the holder are sectored upon the tire and may be easily accessed by the user in servicing the mobile machine.

In contrast to prior-art designs, the sections of the present holder apparatus are advantageously made of few pieces, which assists in the ease of manufacture. The tool holder may be fabricated by injection molding, coldpress, or any suitable method of manufacture common in the art. Such fabrication enables various configurations of the present invention. Such variations may be dependent upon, but not limited to, variations in wheel sizes and tool sizes. This simple yet innovative design shown by the preferred embodiment and referred to below by reference to the drawings is to be understood as merely representative. It will be clear to one skilled in the art from the following detailed description that various embodiments exist within the scope of the present invention without straying from the spirit of this invention.

DESCRIPTION OF THE PREFERRED EMBODIMENT

Figure 1:
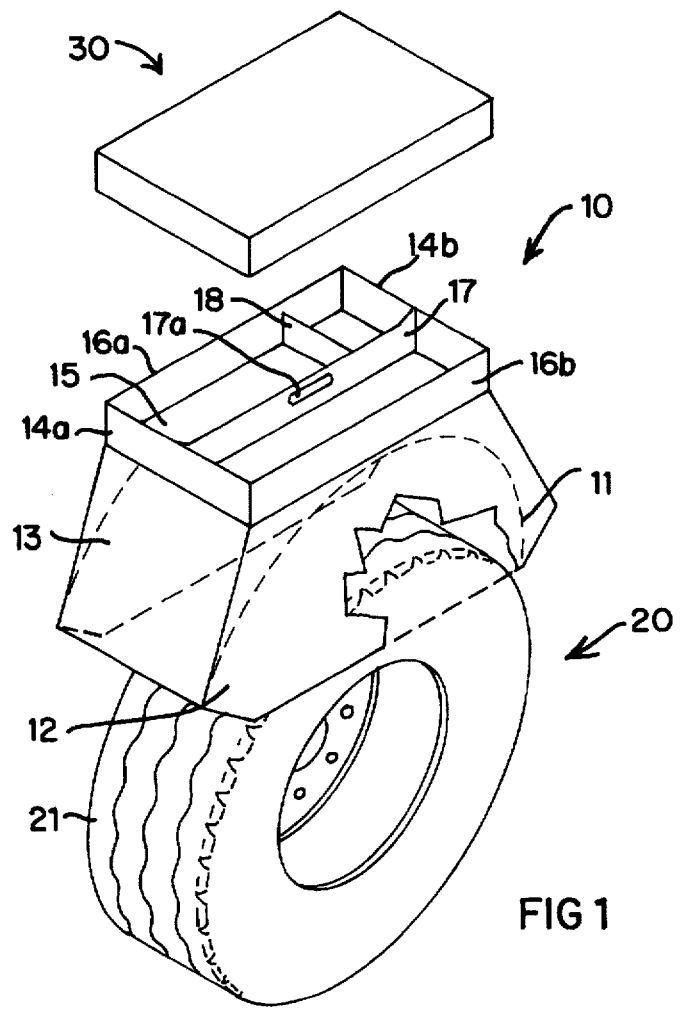
FIG. 1 is an elevational view with a partial cutaway of a tool holder assembly in accordance with a preferred embodiment of the present invention elevated upon a conventional wheel.

In reference to FIG. 1, there is shown a tool holder 10 in accordance with a preferred embodiment of the present invention superimposed above a standard wheel 20. The tool holder 10 includes a top section having a base 15 upon which items, such as tools (not shown), are placed. It is to be understood that such items are not limited to tools. Any items placed upon the base 15 are retained in specific areas of the top section by partitions 17 and 18. For purposes of illustration, only partitions 17 and 18 are shown. However, any configuration of extra partitions may be utilized as desired to compartmentalize the top section as needed for storage of items of various shapes and dimensions. Edges 14a, 14b, 16a, and 16b are included in the top section to further retain items within the partitioned areas.

Figures 2, 3:
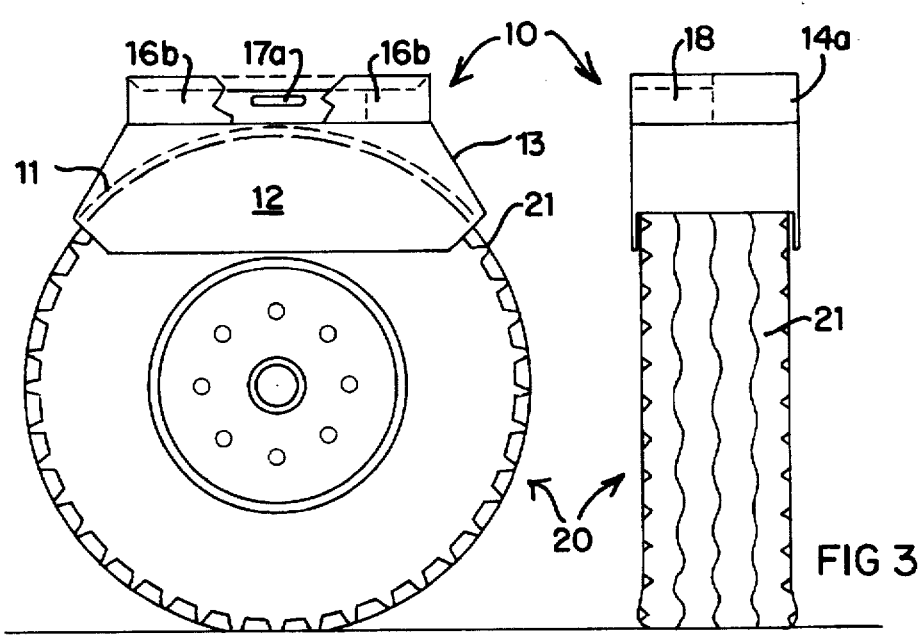
FIG. 2 is a side view with a partial cutaway of the tool holder shown in FIG. 1 as placed upon a conventional wheel.
FIG. 3 is an edgewise view of the tool holder shown in FIG. 1 as placed upon a conventional wheel.

With additional reference to FIG. 2 as well as FIG. 1, there is shown a handle 17a located centrally along the partition 17. The location of handle 17a may be altered as necessary, but overall balance of the tool holder 10 is considered so as to not detract from portability of the tool holder 10. The handle 17a provides a simple means for easily moving the holder 10 to any desired location. In an alternative embodiment, there may be a set of handles located at opposing edges, such as at edges 14a and 14b, or edges 16a and 16b so as to provide balance. It is to be understood that the tool holder 10 may include a lid (not shown) that may or may not include a latch or lock. Such a lid may be detachably connected thereto. Such additions would be understood to be well within the scope of the instant invention.

It is shown by way of FIG. 1, that the tool holder 10 has a bottom section that includes a pair of sidewalls 12 (one shown) and a pair of endwalls 13 (one shown). An upper region of the bottom section is attachable to the top section. The bottom section may be formed as an integral part with the top section or it may be attachable thereto by conventional means such as by clasps, screws, and the like. The endwalls 13 of the bottom section are flared outward from edges 14a and 14b so as to permit the bottom section to fit over the wheel 20. This also enables stability since the widened bottom serves as a firm base when the tool holder 10 is placed on a flat surface, such as a countertop or garage floor. The sidewalls 12 may essentially continue along the same line as the edges 16a and 16b of the top section such that the tool holder 10 fits relatively snugly on the wheel 20, although some flaring may be possible, provided the tool holder 10 is not permitted to pivot on the wheel 20. The area enclosed by sidewalls 12 and endwalls 13 is further defined by a curved base 11. The curved base 11 provides a support for the tool holder 10 when placed upon wheel 20.

With reference to FIGS. 2 and 3, it is shown that sidewalls 12 and curved base 11 are configured to matingly rest upon wheel 20. Appropriate dimensions of sidewalls 12 and curved base 11 am chosen for various wheel sizes. It is noted that the dimensions of the cavity formed by sidewalls 12 and curved base 11 need not conform exactly to the particular wheel shape so long as the wheel shape is no larger than the dimensions of the cavity. Providing various cavity shapes within the scope of the invention is facilitated by fabricating the tool holder 10 of material capable of maintaining its strength in varying shapes and sizes. Suitable materials are high impact plastics which may be injection molded into an assortment of shapes and sizes with partitions 17, 18 of varying configurations, or sheet metal which may be stamped out into similar varying shapes, sizes, and configuration. It must be recognized that alternative materials and manufacture methods may be used as appropriate without straying from the scope of the instant invention.

The method of the present invention involves a tool user utilizing the tool holder 10. The user may choose tools from a large immobile selection of tools. The user places the selected tools within tool holder 10 and carries the loaded tool holder 10 to some location near a portion of a mobile machine. The user will align the tool holder 10 with a cylindrical portion 21 of the wheel 20 generally described as the track or tread of the wheel, and is placed upon a portion of the wheel's tread that is nearer the portion of the mobile machine to be serviced. The user will then secure the tools by placing the tool holder 10 atop the wheel 20. This assures that the necessary servicing tools are located near the portion of the wheeled machine that is being serviced, yet located out of harm's way.

The apparatus and method of the present invention thus allow a tool holder 10 to be quickly and easily mounted upon a conventional wheel 20, or a similar component of relatively large machinery to be serviced, without posing a hazard to safety. It has been found that the tool holder 10 and the method of using it greatly eases the accessibility to tools during servicing of wheeled machinery. Those skilled in the art may now appreciate from the above description that concepts of the present invention may be implemented in a variety of forms. Accordingly, while the tool holder 10 has been described in connection with a particular embodiment thereof, the true scope of the invention should not be so limited since other modifications will become apparent to one skilled in the art in light of the specification and following claims.

I claim:

1. A one-piece holder for carrying items to and from mobile machinery to be serviced, said holder comprising:

a top section including compartments in which said items may be placed, a bottom section including two endwalls, two sidewalls, a curved base, and a downward-facing open cavity bounded by said sidewalls, said curved base, and said cavity conforming substantially to a shape of a wheel of said machinery and, a contiguous, coplanar edge formed by ends of said curved base, edges of said endwalls, and edges of said sidewalls that provides support to said holder during placement upon a flat surface, wherein said cavity includes an abutting surface, consisting of an inner surface of each of said sidewalls and an exposed surface of said curved base, that provide support to said holder during holder placement upon said wheel of said machinery.

2. The holder as claimed in claim 1 further comprising one or more handles forming a portion of said top section.

3. The holder as claimed in claim 1 wherein said holder is made uniformly of sheet metal.

4. The holder as claimed in claim 1 wherein said holder is made uniformly of plastic.

* * * * *